United States Patent
Hamaguchi et al.

(10) Patent No.: US 7,969,834 B2
(45) Date of Patent: Jun. 28, 2011

(54) OPTICAL PICKUP DEVICE HAVING A STRUCTURE PROVIDING EFFICIENT LIGHT USAGE

(75) Inventors: Shinichi Hamaguchi, Hyogo (JP); Naoki Nakanishi, Shiga (JP); Tatsuya Nakamori, Okayama (JP); Naoto Shimada, Hyogo (JP)

(73) Assignee: Panasonic Corporation, Osaka (JP)

( * ) Notice: Subject to any disclaimer, the term of this patent is extended or adjusted under 35 U.S.C. 154(b) by 839 days.

(21) Appl. No.: 11/763,163

(22) Filed: Jun. 14, 2007

(65) Prior Publication Data
US 2008/0049566 A1    Feb. 28, 2008

(30) Foreign Application Priority Data
Aug. 25, 2006 (JP) .................. 2006-229323

(51) Int. Cl.
*G11B 7/00* (2006.01)
(52) U.S. Cl. .................. 369/44.37; 369/44.41; 369/120
(58) Field of Classification Search .................. None
See application file for complete search history.

(56) References Cited

U.S. PATENT DOCUMENTS

| | | | |
|---|---|---|---|
| 6,928,035 B2* | 8/2005 | Komma et al. | 369/44.37 |
| 7,180,837 B2* | 2/2007 | Yi et al. | 369/44.37 |
| 7,247,826 B2 | 7/2007 | Hamaguchi et al. | |
| 7,313,061 B2* | 12/2007 | Nishimoto et al. | 369/44.37 |
| 2001/0046037 A1* | 11/2001 | Ota et al. | 355/53 |
| 2003/0227860 A1* | 12/2003 | Hamaguchi et al. | 369/112.12 |
| 2006/0078021 A1 | 4/2006 | Fujihara et al. | |
| 2007/0019518 A1* | 1/2007 | Wachi et al. | 369/44.37 |
| 2007/0075223 A1 | 4/2007 | Murao et al. | |
| 2007/0108374 A1 | 5/2007 | Fukuda et al. | |

FOREIGN PATENT DOCUMENTS

| | | |
|---|---|---|
| JP | 2001-176119 | 6/2001 |
| JP | 2002-109759 | 4/2002 |
| JP | 2006-302456 | 11/2006 |

OTHER PUBLICATIONS

English language Abstract of JP 2001-176119.

\* cited by examiner

*Primary Examiner* — William J Klimowicz
*Assistant Examiner* — Emily Frank
(74) *Attorney, Agent, or Firm* — Greenblum & Bernstein, P.L.C.

(57) ABSTRACT

The optical pickup device according to the present invention includes: a light source which emits light at first, second and third wavelengths; an optical path combining unit which combines vectors of the light at the first, second and third wavelengths which is emitted by the light source, and matches optical axes of the light at the first wavelength and the light at the third wavelength; a light condensing unit which condenses the light from the optical path combining unit onto the optical information storage medium; a diffraction element which diffracts light at the first, second and third wavelength which is reflected from the optical information storage medium, in a first direction and a second direction respectively; a first photo detector which receives light at the first, second and third wavelength that is diffracted in the first direction by the diffraction element; a second photo detector which receives light at the first and third wavelength that is diffracted in the second direction by the diffraction element; and a third photo detector which receives light at the second wavelength that is diffracted in the second direction by the diffraction element.

11 Claims, 12 Drawing Sheets

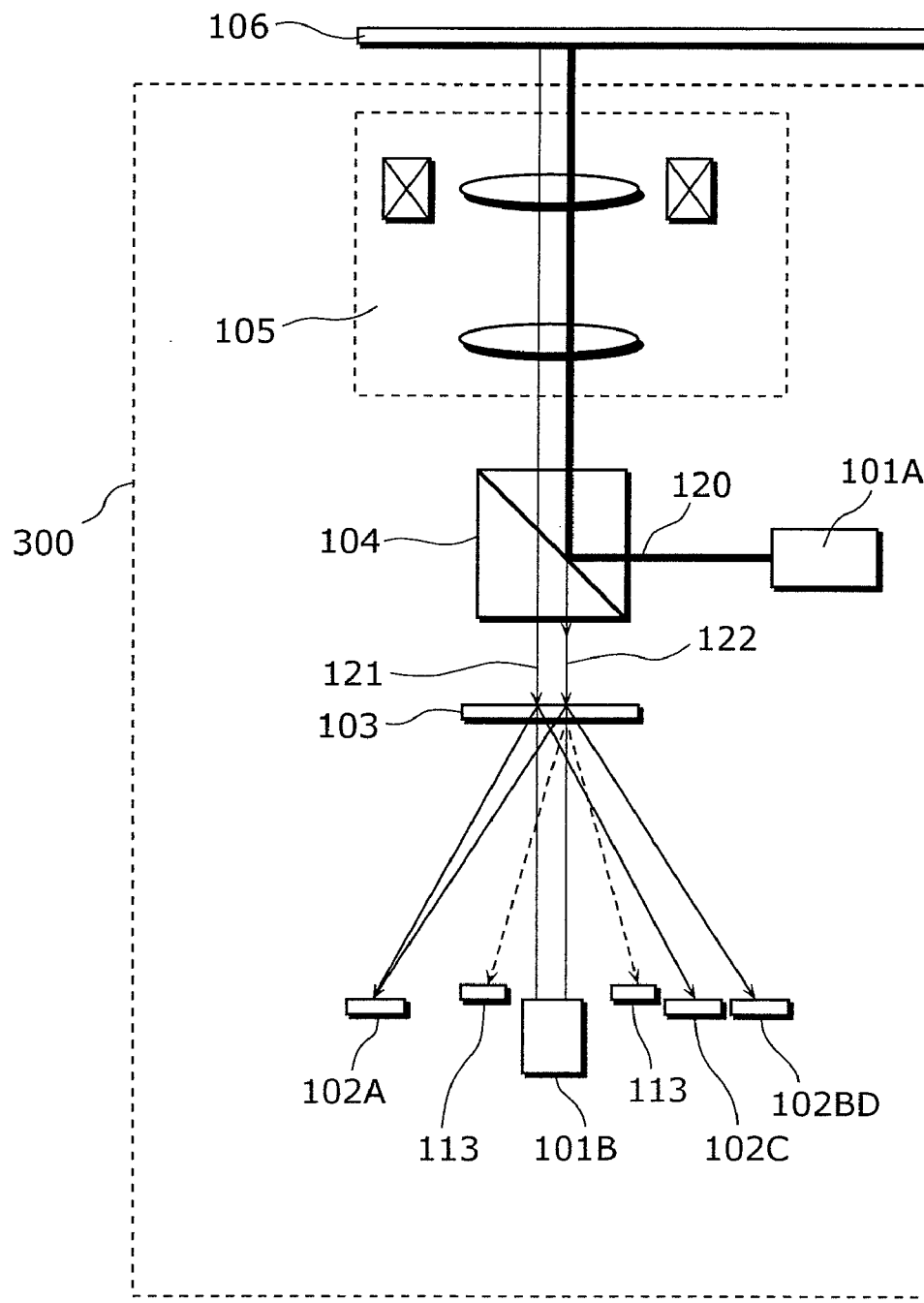

OPTICAL PICKUP DEVICE HAVING A STRUCTURE PROVIDING EFFICIENT LIGHT USAGE

BACKGROUND OF THE INVENTION (1) Field of the Invention

The present invention relates to an optical pickup device which stores, reproduces and erases information on an optical information storages medium such as an optical disc and an optical card.

(2) Description of the Related Art

As a highly accurate/high capacity storage medium, the applicable range for optical memory technology which uses an optical information storage medium with a pit pattern is expanding to digital audio discs, video discs, document file discs, data files and so on. In optical memory technology, information is stored and reproduced with high accuracy and high reliability in an optical information storage medium using a minutely focused optical beam. These storage and playback processes depend entirely on an optical system. The basic functions of the optical pickup device, which is the main section of the optical system, are divided into condensing which forms diffraction limit microspots, controlling focal points in the optical system, tracking control for the optical system and detecting pit signals. These functions are realized by combining each type of optical system with a photoelectric conversion detection protocol according to objective and application. In recent years, in order to miniaturize and make the optical pickup device thinner, diffraction elements (holograms) are utilized (see for example, Patent Document 1).

FIG. 1 is a diagram which shows the structure of an optical pickup device which utilizes a conventional diffraction element. The optical pickup device 1000 shown in FIG. 1 stores, reproduces and deletes information in the optical information storage medium 1106. For example, the optical information storage medium 1106 is a Compact Disc (CD), a Digital Versatile Disc (DVD), a Blu-ray Disc (BD) or a High Definition DVD (HD-DVD). The optical pickup device 1000 includes a light source 1101A and 1101B, photo detectors 1102A, 1102B, 1102C and 1102D, a diffraction element 1103, an optical path combining unit 1104 and a light condensing unit 1105.

The light source 1101A is a light source which emits light at a first wavelength (for example, blue light) 1120. The light source 1101B is a light source which emits a light (for example, a red-colored light) 1121 at a second wavelength longer than the first wavelength, and a light (for example, an infrared light) 1122 at a third wavelength longer than the second wavelength.

The light 1120 at the first wavelength released from the light source 1101A is reflected by the optical path combining unit 1104, condensed by the light condensing unit 1105, irradiated onto the optical information storage medium 1106 and reflected by the optical information storage medium 1106. The light reflected by the optical information storage medium 1106 is condensed by the light condensing unit 1105, passes through the optical path combining unit 1104, enters into the diffraction element 1103 and is diffracted such that the light enters into the photo detectors 1102A and 1102B.

A light 1121 at the second wavelength released from the light source 1101B is condensed by the light condensing unit 1105, irradiated onto the optical information storage medium 1106 and reflected by the optical information storage medium 1106. The light reflected by the optical information storage medium 1106 is condensed by the light condensing unit 1105, enters the diffraction element 1103, and is diffracted such that the light is introduced into the photo detectors 1102A and 1102C. The light 1122 at the third wavelength is released from the light source 1101B, condensed by the light condensing unit 1105, irradiated onto the optical information storage medium 1106 and reflected by the optical information storage medium 1106. The light reflected by the optical information storage medium 1106 is condensed by the light condensing unit 1105, enters the diffraction element 1103, and is diffracted such that the light is introduced into the photo detectors 1102A and 1102D.

In other words, when the light diffracted to the right side of the figure by the diffraction element 1103 is defined as −(minus), and the light diffracted to the left side as +(plus), out of the diffracted light at the first through third wavelengths, +primary diffracted light enters the photo detection device 1102A. For −primary diffracted light, diffracted light at the first wavelength enters the photo detector 1102B, diffracted light at the second wavelength enters the photo detector 1102C and diffracted light of the third wavelength enters into the photo detector 1102D. A signal is outputted according to the amount of received light from the photo detectors 1102A through 1102D respectively.

Japanese Unexamined Patent Application Publication No. 2001-176

SUMMARY OF THE INVENTION

However, in a conventional optical pickup device which obtains the signal for the optical information storage medium 1106 via +primary diffracted light and −primary diffracted light, there are three optical axes corresponding to each light at the first through third wavelengths. Thus, when the optical axis of one at the first through third wavelength is aligned with the center of the light condensing unit 1105, the remaining two optical axes deviate from the center of the light condensing unit 1105. Thus, the efficiency of light usage decreases for an optical axis that has deviated from the center of the light condensing unit 1105. In other words, the conventional optical pickup device has the problem that the efficiency of light usage drops for the entire optical pickup device.

The present invention is realized in order to solve the problem above and has an object providing an optical pickup device with a high efficiency of light usage using light of three wavelengths.

In order to achieve the object above, the optical pickup device is an optical pickup device which performs at least one of writing and reading information in an optical information storage medium, the optical pickup device including: a light source which emits light at first, second and third wavelengths; an optical path combining unit which combines vectors of the light at the first, second and third wavelengths which is emitted by the light source, and to match optical axes of the light at the first wavelength and the light at the third wavelength; a light condensing unit which condenses the light from the optical path combining unit onto the optical information storage medium; a diffraction element which diffracts light at the first, second and third wavelength that is reflected from the optical information storage medium, in a first direction and a second direction respectively; a first photo detector which receives light at the first, second and third wavelength that is diffracted in the first direction by the diffraction element; a second photo detector which receives light at the first and third wavelength that is diffracted in the second direction by the diffraction element; and a third photo detector which receives light at the second wavelength that is diffracted in the second direction by the diffraction element.

With this structure, the conventional three axes can be reduced to two axes. Thus, the efficiency of light usage can be improved by reducing the number of light axes apart from the center of the light condensing unit.

Also, the first photo detector may receive positive secondary diffracted light at the first wavelength, positive primary diffracted light at the second wavelength and positive primary diffracted light at the third wavelength from the diffraction element; the second photo detector may receive negative secondary diffracted light at the first wavelength, and negative primary diffracted light at the third wavelength from the diffraction element; and the third photo detector may receive negative primary diffracted light at the second wavelength from the diffraction element.

Also, the optical pickup device may include a stray light reflection unit formed at a position where positive or negative primary diffracted light at the first wavelength diffracted by the diffraction element is irradiated, the stray light reflection unit reflecting irradiated light.

With this structure, it is possible to prevent ±primary diffracted light at the first wavelength, which is unnecessary conventionally, from becoming stray light. Thus, the deterioration of recording, playback and deleted signals in the optical information storage medium due to stray light can be prevented.

Also, the stray light reflection unit may be composed of aluminum or gold.

With this structure, the stray light reflection unit can be implemented without adding new material, since the stray light reflection unit is composed of material generally used in the manufacturing (diffusion) process for semiconductor substrates.

Also, the first photo detector, the second photo receptor and the third photo receptor may be formed on the same substrate, and the optical pickup device may further include: a reflection prevention unit formed at a position where positive or negative primary diffracted light diffracted by the diffraction element is irradiated; and the reflection prevention unit prevents irradiated light from entering the substrate.

With this structure, the generation of (reflected) stray light can be prevented, where the stray light generated by ±primary diffracted light generated by the diffraction element and not used as signal light is reflected by the photo detector formed on the substrate. Also, by laying out a photo detection diode directly under the refelection prevention unit, stray light in the substrate (a carrier generated by unused light) generated by introducing a ±primary diffracted light at the first wavelength can be prevented from entering the first photo detector, the second photodetector and the third photo detector.

Also, the optical pickup device may include a fourth photo detector which receives positive or negative primary diffracted light at the first wavelength which is diffracted by the diffraction element.

With this structure, ±primary diffracted light at the first wavelength is received by the fourth photo detector and can be converted into an electric signal.

Also, the fourth photo detector may have a function for monitoring output of light at the first wavelength.

With this structure, the number of photo detectors for monitoring the output of light at the first wavelength can be reduced and thus the number of parts can be reduced by using the fourth photo detector as an output monitor for the first wavelength. Thus, the optical pickup device can be miniaturized.

Also, the fourth photo detector may have a function for outputting a signal from the optical information storage medium.

With this structure, the usage efficiency of light at the first wavelength can be further improved by using ±primary diffracted light at the first wavelength as a signal light from the information storage medium.

Also, light at the first wavelength may be blue light, light at the second wavelength may be red light and light at the third wavelength may be infrared light.

With this structure, for example, the efficiency of light usage can be improved for an optical pickup device that is compatible with a BD (or HD-DVD) that uses blue light, a DVD that uses red light and a CD that uses infrared light.

Also, the light source includes a first light source which emits light at the first wavelength and a second light source which emits light at the second and third wavelength, and the second light source, the first photo detector, the second photo detector and the third photo detector may be laid out on the same substrate.

With this structure, installation space can be reduced by integrating the second light source with the first through third photo detectors. Thus, costs can be reduced for the optical pickup device.

Also, a cross section shape of the diffraction element may be a serrated shape.

With this structure, for example, the peak of efficiency for the secondary diffracted light at the first wavelength (wavelength 405 nm), and the peak of efficiency for the primary diffracted light at the second wavelength (wavelength 650 nm) and the third wavelength (wavelength 780 nm) appear at a position with nearly the same grating depth. Thus, light of the first wavelength (wavelength 405 nm), the second wavelength (wavelength 650 nm) and the third wavelength (wavelength 780 nm) can be easily detected by a single first photo detector.

The present invention can provide an optical pickup device with a high efficiency of light usage which uses light of three wavelengths.

FURTHER INFORMATION ABOUT TECHNICAL BACKGROUND TO THIS APPLICATION

The disclosure of Japanese Patent Application No. 2006-229323 filed on Aug. 25, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a diagram which shows the structure of the optical pickup device according to the third embodiment of the present invention;

DESCRIPTION OF THE PREFERRED EMBODIMENT(S)

Below, an embodiment of the optical pickup device according to the present invention is explained in detail with reference to the diagrams.

First Embodiment

The optical pickup device according to the first embodiment of the present invention is an optical pickup device compatible with light of three wavelengths, and which make two optical axes by combining light of two wavelengths. Thus, the efficiency of light usage can be improved.

First, the structure of the optical pickup device according to the first embodiment of the present invention is explained.

Figure 1:
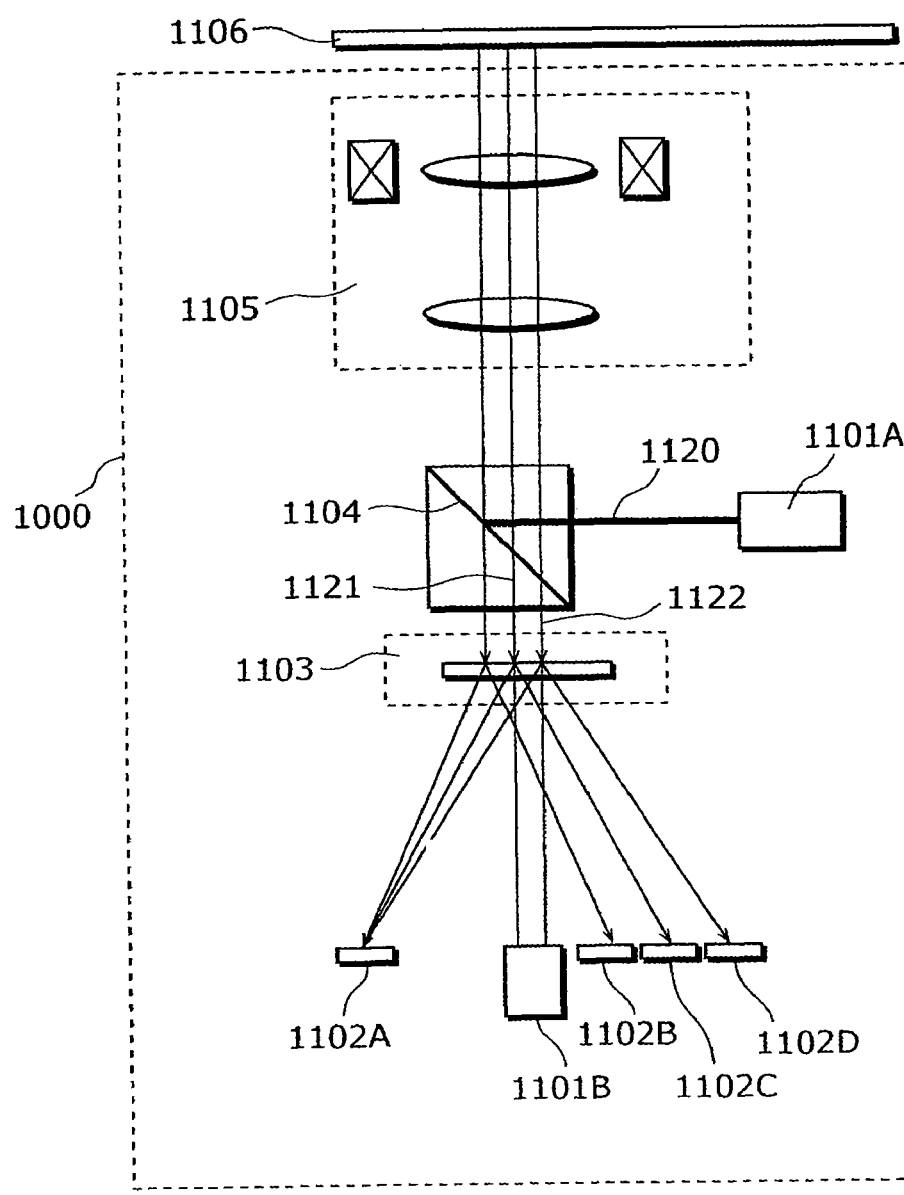
FIG. 1 is a diagram which shows the structure of a conventional optical pickup device.
Figure 2:
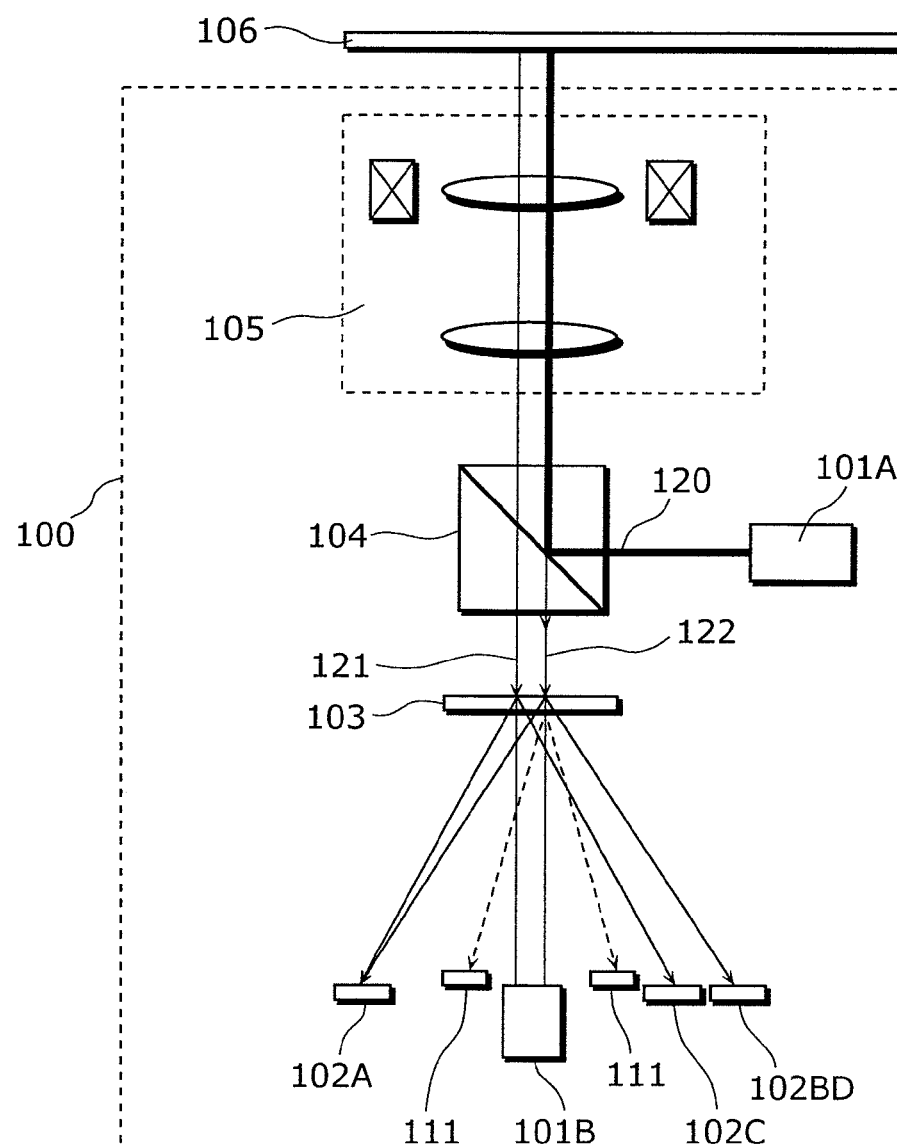
FIG. 2 is a diagram which shows the structure of an optical pickup device according to the first embodiment of the present invention.

FIG. 2 is a diagram which shows a conceptual structure of the optical pickup device according to the first embodiment of the present invention.

The optical pickup device 100 shown in FIG. 2 stores, reproduces and deletes information in an optical information storage medium 106. The optical pickup device 100 includes a light source 101A and 101B, a photo detector 102A, 102BD, and 102C, a diffraction element 103, an optical path combining unit 104, a light condensing unit 105 and a stray light reflection region 111.

The optical pickup device 100 according to the first embodiment of the present invention differs from the conventional optical pickup device in that the optical path combining unit 104 nearly matches light at the first wavelength and light at the third wavelength and in that the optical pickup device 100 includes the stray light reflection region 111.

The light source 101A is a light source which emits a light 120 at the first wavelength. The light source 101B is a light source which emits a light 121 at the second wavelength which is longer than the first wavelength, and a light 122 at the third wavelength which is longer than the second wavelength. The first wavelength is for example 405 nm (blue-colored light) for BD or HD-DVD, the second wavelength is for example 650 nm (red-colored light) for DVD and the third wavelength is for example 780 nm (infrared light) for CD. Also, the light sources 101A and 101B are for example semiconductor lasers.

The photo detectors 102A, 102C and 102BD output signals according to the amount of received light. For example, the photo detectors 102A, 102C and 102BD are photo detector diodes formed on an identical semiconductor (Si) substrate. Note that when the photo detectors 102A, 102C and 102BD are not specifically differentiated, they are written as photo detector 102.

The diffraction element 103 diffracts reflected light from the optical information storage device 106. The diffraction element 103 is for example a hologram element.

The optical path combining unit 104 combines the vectors of light at the first, second and third wavelength emitted by the light sources 101A and 101B. The optical path combining unit 104 matches the optical axes of light at the first wavelength and light of the third wavelength. The optical path combining unit 104 is for example a polarized light beam splitter. The optical path combining unit 104 causes the light at the first wavelength (405 nm) to reflect or pass according to the polarized light vector.

The light condensing unit 105 condenses light from the optical path combining unit 104 in the optical information storage media 106. The light condensing unit 105 is for example an actuator which includes a collimator lens and an objective lens.

A stray light reflection area 111 is formed at a position, at which ±primary diffracted light at the first wavelength in the semiconductor substrate on which the photo detector 102 is formed, is introduced. The stray light reflecting area 111 reflects irradiated light. For example, the stray light reflection area 111 is composed of metal such as aluminum or gold.

Between, the set position of the light source 101B and the set position of the optical information storage media 106, a diffraction element 103, an optical path combining unit 104 and a light condensing unit 105 are laid out in respective order starting from the light source 101B. The light source 101A is laid out such that light may be directly emitted towards the optical path combining unit 104. The photo detector 102 and the stray light reflection area 111 are laid out on one end of the diffraction element 103 (the opposite direction of the direction in which the optical path combining unit 104 is laid out).

Next, the operations of the optical pickup device 100 are explained.

The light emitted from the light source 101A is reflected by the optical path combining unit 104, condensed by the light condensing unit 105, irradiated onto the optical information storage media 106 and reflected in the optical information storage media 106. The light reflected by the optical information storage medium 106 is condensed by the light condensing unit 105, passes through the optical path combining unit 104, enters the diffraction element 103 and is diffracted such that the light selectively enters into one of the photo detectors 102.

The light emitted from the light source 101B passes through the diffraction element 103 and the optical path combining unit 104, is condensed in the light condensing unit 105, irradiated onto the optical information storage medium 106 and reflected by the optical information storage medium 106. The light reflected by the optical information storage medium 106 is condensed by the light condensing unit 105, passes through the optical path combining unit 104, enters the diffraction element 103 and is diffracted such that the light selectively enters into one of the photo detectors 102.

When the diffracted light on the right side of the diagram is defined by the diffraction element 103 as −(minus), and the light diffracted on the left side as +(plus), then the +secondary diffracted light at the first wavelength and the +primary diffracted light at the second wavelength and the third wavelength enter respectively into the photo detector 102A. −secondary diffracted light at the first wavelength and −primary diffracted light at the third wavelength enter into the photo detector 102BD. −primary diffracted light at the second wavelength enters into the photo detector 102C.

Also, the stray light reflection area 111 reflects the unused ± primary diffracted light at the first wavelength, as a signal light generated by the diffraction element 103. Thus, the generation of stray light on the substrate (a carrier generated by unused light) can be prevented by introducing ±primary diffracted light at the first wavelength into the semiconductor substrate on which the photo detector 102 is formed.

Note that both plus and minus diffracted light for light of each wavelength are detected in the conventional art in order to generate a signal for turning on a focus servo such that both optical spot sizes are fixed on both photo detectors for vertical movement of the optical information storage medium 106.

Thus, the curvature of the diffraction lattice is held such that the focal point of one part of the diffracted light is the underside of a single photo detector (here, the photo detector 102A) in the diffraction element 103 and a focal point of another part of the diffracted light is on the upper side of plural photo detectors (here, the photo detectors 102C and 102BD) in the diffraction element 103. For example, the photo detector 102 preferably uses a reflection prevention film formed on the surface for wavelengths of 405 nm, 650 nm and 780 nm.

Figure 3:
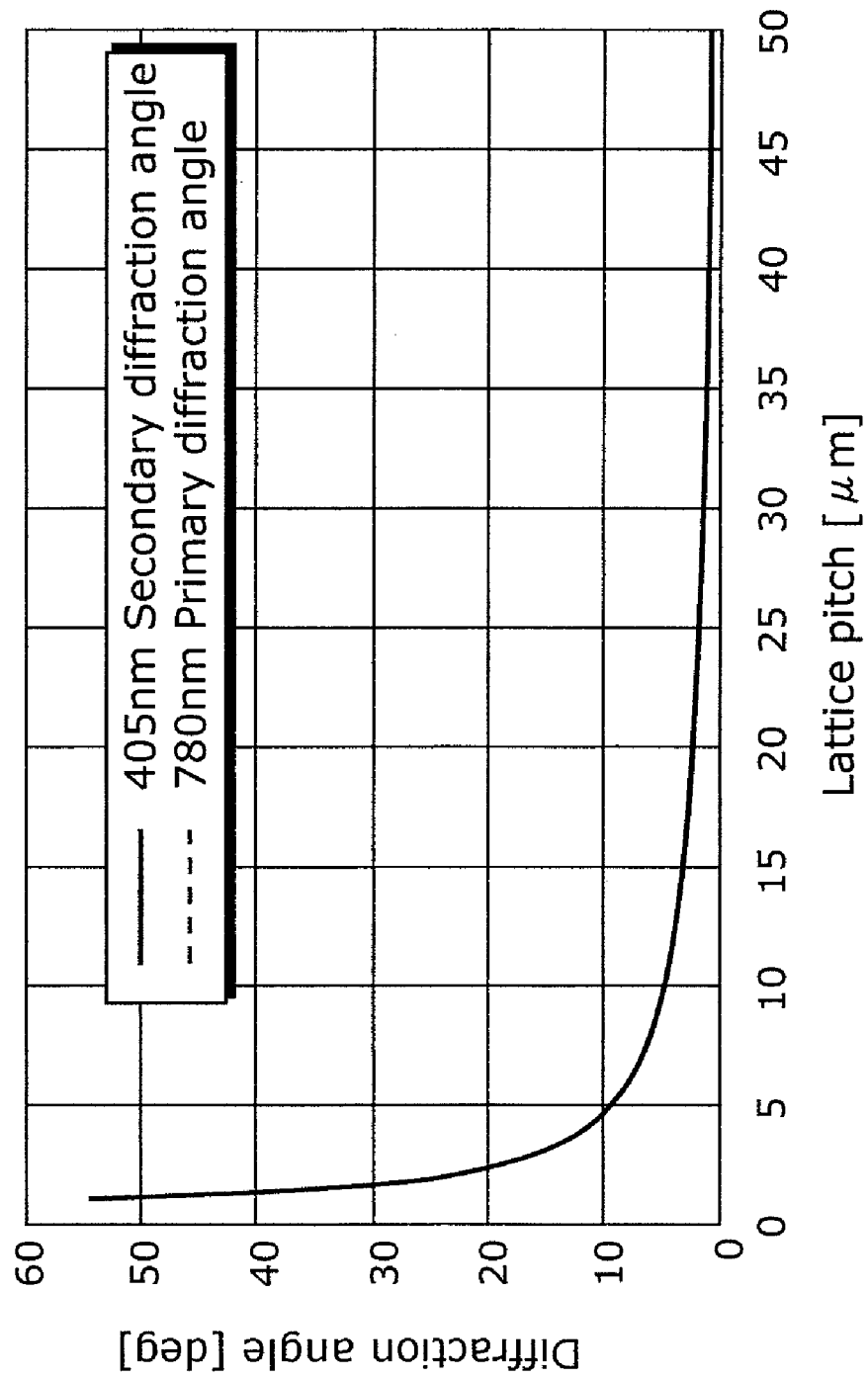
FIG. 3 is a diagram which shows the relationship between a lattice pitch of secondary diffracted light at the first wavelength and primary diffracted light at the third wavelength, and the angle of diffraction.

FIG. 3 is a diagram which shows the relationship between the lattice pitch and the diffraction angle for secondary diffracted light at the first wavelength (wavelength 405 nm) and primary diffracted light at the third wavelength (wavelength 780 nm). As shown in FIG. 3, the secondary diffracted light at the first wavelength and the primary diffracted light of the third wavelength have mostly the same diffraction value for each value of the lattice pitch. Using these properties, the −secondary diffracted light at the first wavelength and the −primary diffracted light of the third wavelength can be detected by the photo detector 102BD alone. Normally it is enough when [the angle of secondary diffracted light at the first wavelength]−[the angle of primary diffracted light at the third wavelength] is within two degrees.

Figure 4A:
FIG. 4A is a diagram which shows a cross-section structure of the lattice shape used in the diffraction element.
Figure 4B:
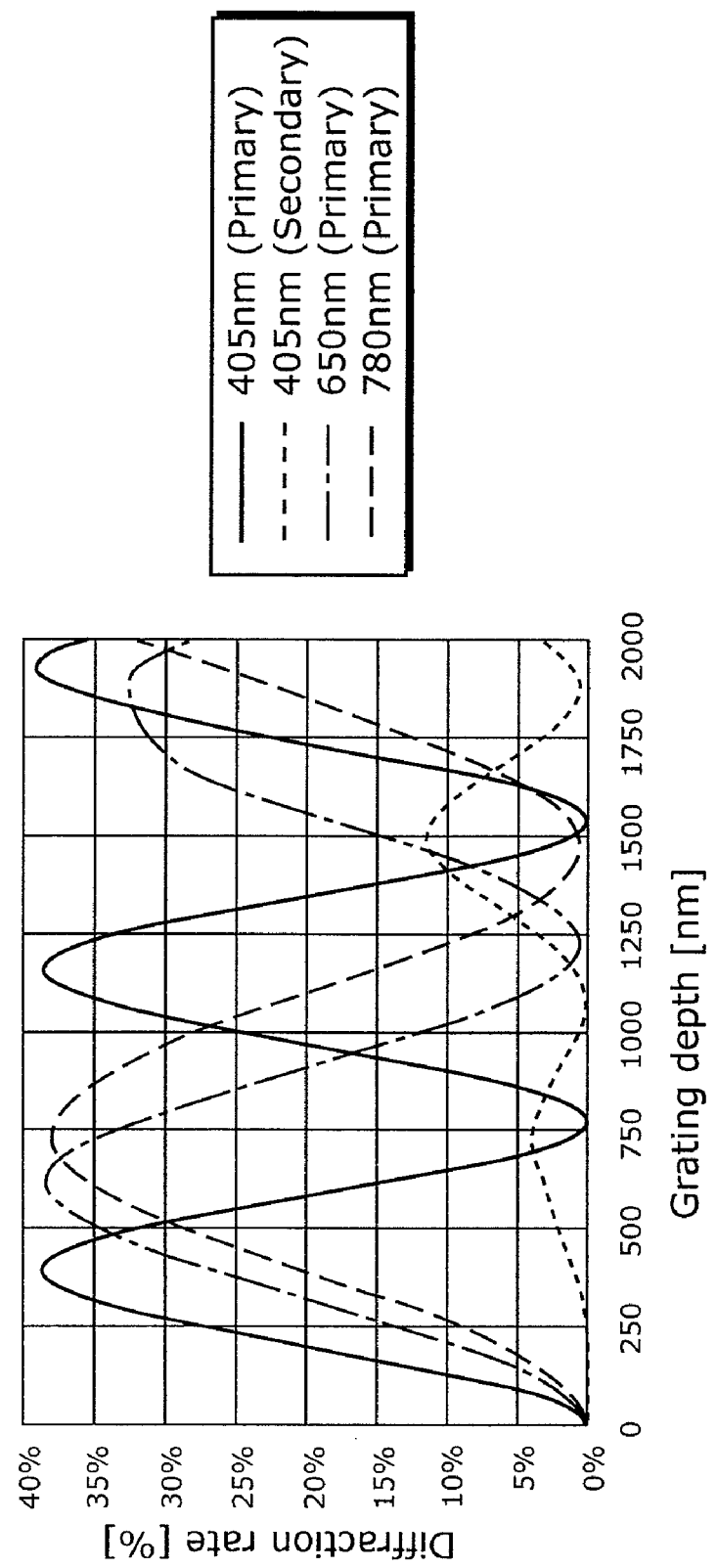
FIG. 4B is a diagram which shows the relationship between the grating depth and the diffraction efficiency.
Figure 5A:
FIG. 5A is a diagram which shows a cross-section structure of the lattice shape used in the diffraction element.
Figure 5B:
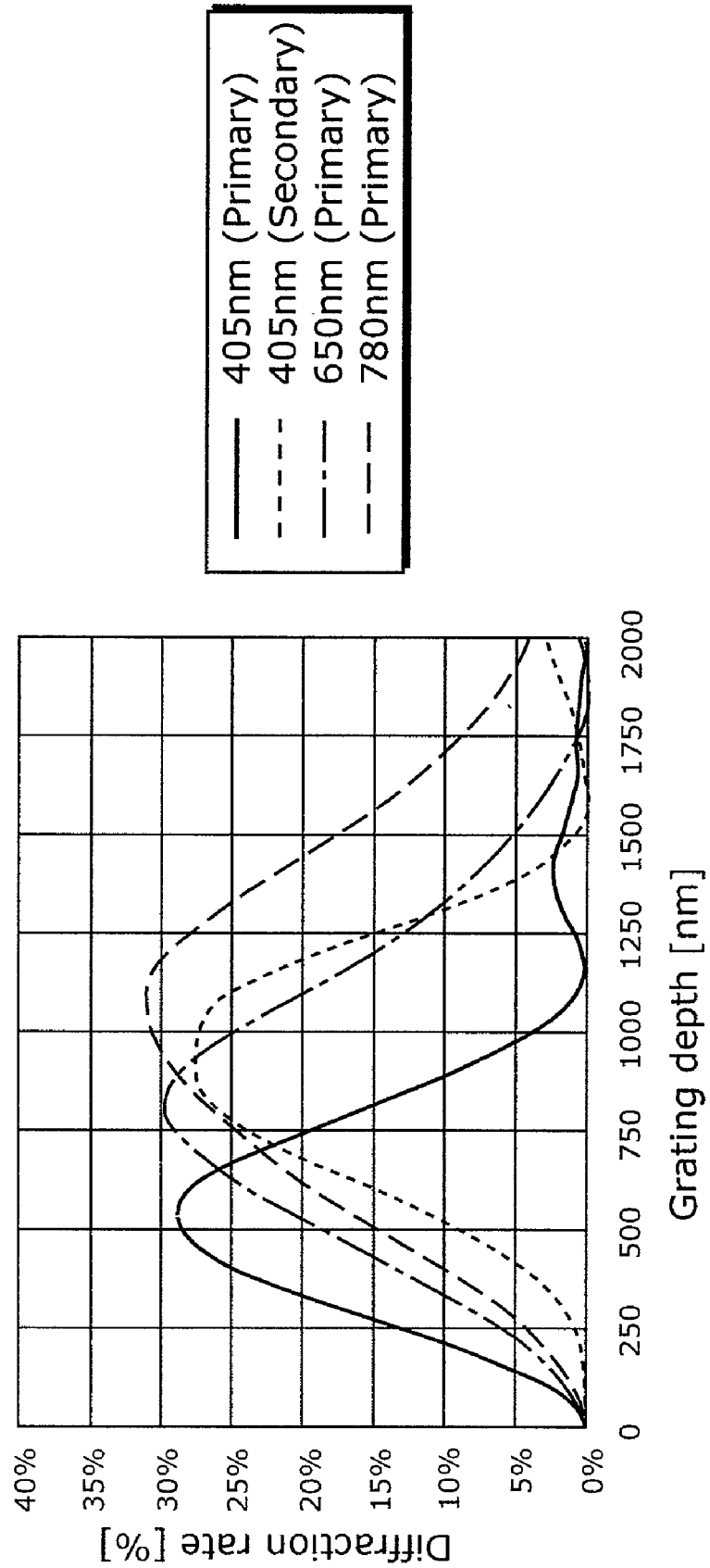
FIG. 5B is a diagram which shows the relationship between the grating depth and the diffraction efficiency.

FIG. 4A and FIG. 5A are diagrams which show a cross-section structure of the lattice shape used in the diffraction element 103. FIGS. 4B and 5B are diagrams which show the relationship between grating depth and diffraction efficiency. FIG. 4A is a diagram which typically shows the cross-section structure of a rectangular lattice shape. FIG. 4B is a diagram which shows the relationship between grating depth and diffraction efficiency in the rectangular lattice shape. Note that the refractive index for the diffraction element 103 is 1.52, and for the lattice space, 2.5 μm. As shown in FIG. 4A, the cross section shape of the diffraction lattice is a rectangular wave shape, in other words rectangles lined up on one side in a concavoconvex shape; the peak for the second diffraction efficiency at the first wavelength (wavelength 405 nm) and the peak for the first diffraction efficiency at the second wavelength (wavelength 650 nm) and the third wavelength (wavelength 780 nm) appear at a position with a different grating depth, as shown in FIG. 4B.

FIG. 5A is a diagram which shows a typical cross-section structure of a serrated lattice shape. FIG. 5B is a diagram which shows the relationship between the grating depth and the diffraction efficiency in the serrated lattice shape. Note that the refractive index for the diffraction element 103 is 1.52 and for the lattice space, 2.5 μm. As shown in FIG. 5A, the cross-section shape of the diffraction lattice is serrated, in other words, when triangle shapes are arranged in a concavoconvex shape on one side, the peak of the second diffraction efficiency at the first wavelength (wavelength 405 nm), and the peak of the first diffraction efficiency at the second wavelength (650 nm) and the third wavelength (wavelength 780 nm) appear such that their grating depth is nearly identical. Thus, light at the first wavelength (wavelength 405 nm), light at the second wavelength (wavelength 650 nm) and light at the third wavelength (wavelength 780 nm) can be easily detected by a single photo detector 102A.

Accordingly, by using the serrated diffraction element 103 as shown in FIG. 5A, the optical pickup device 100 in the present invention which uses diffracted light from the diffraction element 103, can easily detect light at the first wavelength, light at the second wavelength and light at the third wavelength with a single photo detector 102A.

Note that in the embodiment above, the diffraction element 103 is laid out between the light source 101B and the optical path combining unit 104, however the same effect can be obtained when the diffraction element 103 is laid out between the optical path combining unit 104 and the light condensing unit 105, on the inside of the light condensing unit 105, or between the light condensing unit 105 and the optical information storage medium 106.

Figure 6A:
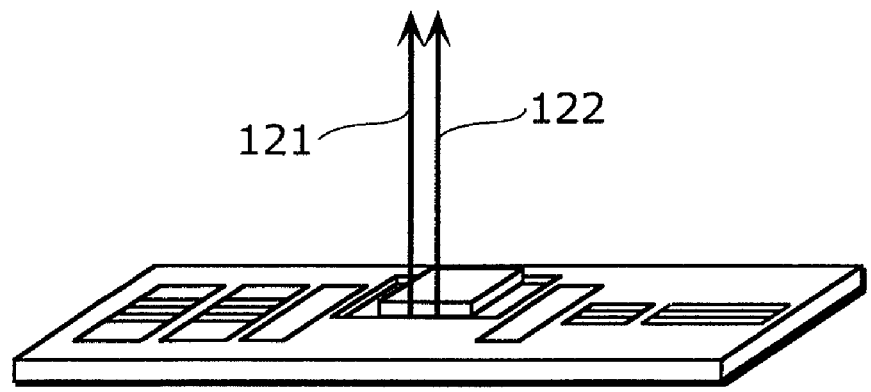
FIG. 6A is a diagonal-view diagram which shows the light source for the optical pickup device and the structure of the photo detector according to the first embodiment of the present invention.
Figure 6B:
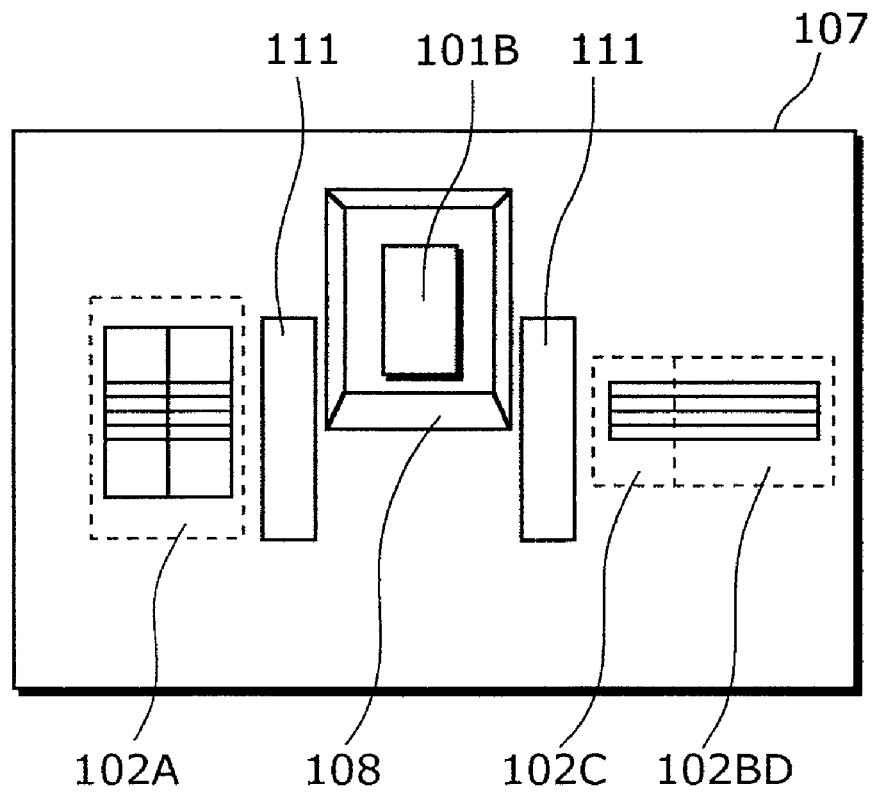
FIG. 6B is an overhead diagram which shows the light source of the optical pickup device and the structure of the photo detector according to the first embodiment of the present invention.

Also, the light source 101B and the photo detector 102 are laid out individually, however the same effect can be obtained even when the light source 101B and the photo detector 102 are used as a combined integrated unit. FIG. 6A is a diagonal view diagram of the integrated unit in which the light source 101B and the photo detector 102 are combined. FIG. 6B is an overhead diagram of the integrated unit in which the light source 101B and the photo detector 102 are combined. As shown in FIG. 6A and FIG. 6B, the photo detector 102 (102A, 102C and 102BD), the light source 101B and the stray light reflection area 111 are laid out on the same semiconductor substrate 107. Also, a light at the second wavelength 121 and a light at the third wavelength 122 are emitted from the light source 101B, reflected by a micro mirror 108 and emitted vertically.

It follows from the above that the optical pickup device 100 according to the first embodiment of the present invention matches the optical axis of light at the first wavelength, which is the minimal wavelength, with light at the third wavelength which is the maximum wavelength. Thus, the number of optical axes may be reduced from the conventional three optical axes to two optical axes. Thus, the efficiency of light use can be improved since the optical axes apart from the center of the light condensing unit 105 can be reduced.

Also, the optical pickup device 100 according to the first embodiment of the present invention includes stray light reflection areas 111. Thus, stray light generated within the substrate by introducing a ±primary diffracted light (a carrier generated by unused light), which is not used as signal light, can be reduced at the first wavelength generated by the diffraction element 103 into the semiconductor substrate of the photo detector 102.

Also, the stray light reflection area 111 is composed of metal such as aluminum or gold. In other words, the stray light reflection areas 111 can be realized without adding new materials since the stray light reflection areas 111 are composed of materials generally used in the manufacturing (diffusion) process for semiconductors.

Also, the optical path combining unit 104 has a function which causes the light at the first wavelength (405 nm) to reflect or pass through according to the vector of polarized light. Thus, the efficiency of light usage can be further improved.

Also, the diffraction element 103 has a serrated cross section shape. Thus, the peak of the second diffraction efficiency of light at the first wavelength (wavelength 405 nm) and the peak of the first diffraction efficiency at the second wavelength (wavelength 650 nm) and the third wavelength light (wavelength 780 nm) appears at positions with nearly the same grating depth. Thus, light at the first wavelength (wavelength 405 nm), light at the second wavelength (wavelength 650 nm) and light at the third wavelength (wavelength 780 nm) can be easily detected by a single photo detector 102A.

Second Embodiment

The optical pickup device according to the second embodiment of the present invention includes a reflection prevention area which prevents reflected stray light from generating.

Figure 7:
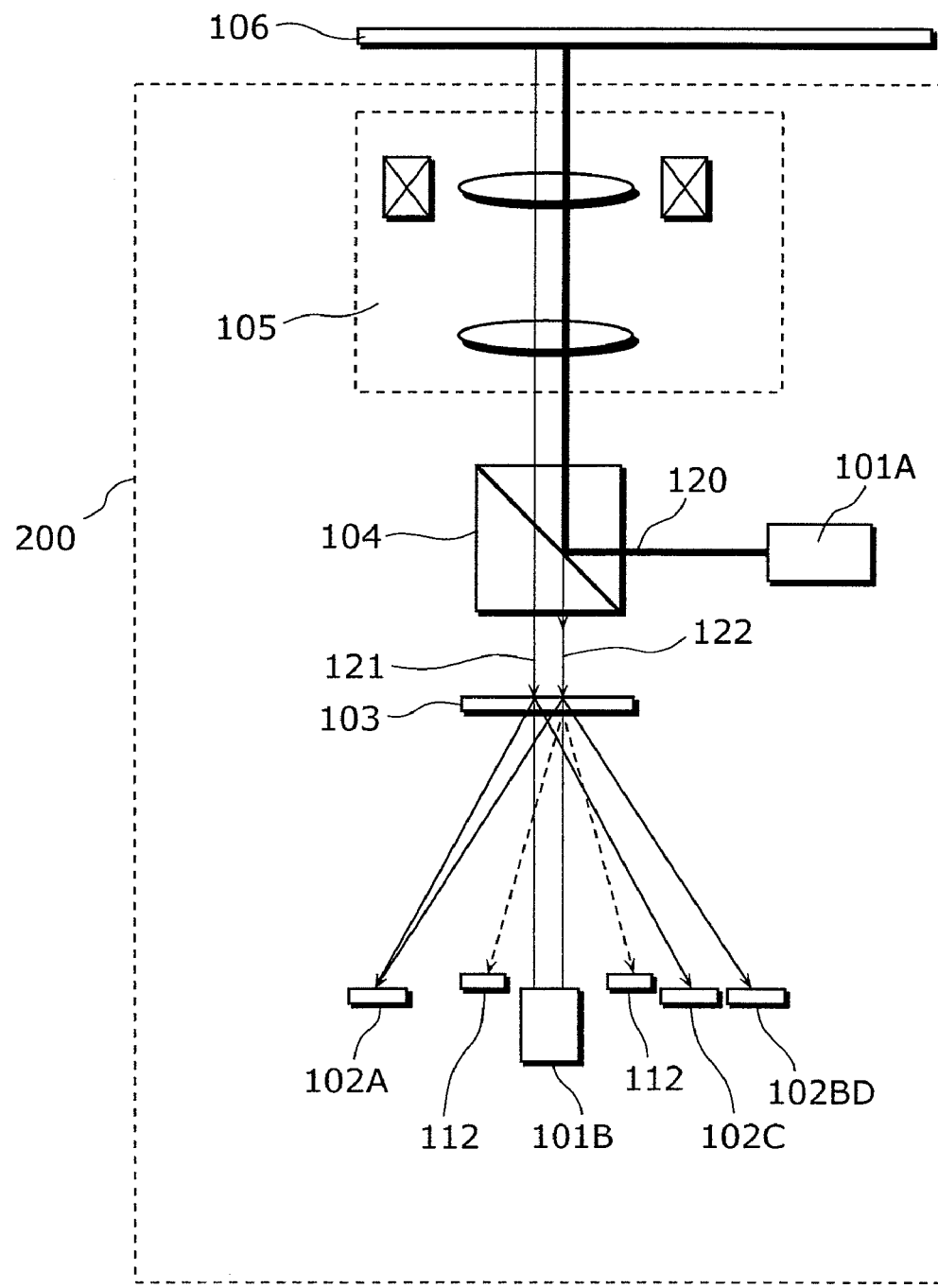
FIG. 7 is a diagram which shows the structure of the optical pickup device according to the second embodiment of the present invention.

FIG. 7 is a diagram which shows a conceptual structure of the optical pickup device according to the second embodiment of the present invention. Note that the same numbers are attached to elements as in FIG. 2 and thus a detailed description is not repeated.

The optical pickup device 200 shown in FIG. 7 stores, reproduces and deletes information in the optical information storage medium 106. The optical pickup device 200 includes the light sources 101A and 101B, the photo detector 102A, 102BD and 102C, the diffraction element 103, the optical path combining unit 104, the light condensing unit 105 and reflection prevention areas 112.

The reflection prevention areas 112 are formed at a position where ±primary diffracted light at the first wavelength in the semiconductor substrate is irradiated, on which the photo detector 102 is formed. The reflection prevention areas 112 prevent the irradiated light from entering the semiconductor substrate. The reflection prevention areas 112 are for example composed of an oxidation layer or a nitrous layer. The reflection prevention areas 112 have a function which prevents (reflected) stray light from occurring by the photo detector 102 reflecting ±primary diffracted light at the first wavelength which is generated by the diffraction element 103 and is not used as signal light. Also, stray light in the substrate (a carrier generated by unused light) generated by introducing ±primary diffracted light at the first wavelength into the semiconductor substrate of the photo detector 102 can be prevented from entering the signal detection photo detectors 102A, 102C and/or 102BD by laying out the photo detector diodes directly under the reflection prevention areas 112.

Also, since the oxidation film and/or the nitride film which make up the reflection prevention area 112 is material that is generally used in the semiconductor manufacturing (diffusion) process, there is no need to add new materials.

Figure 8A:
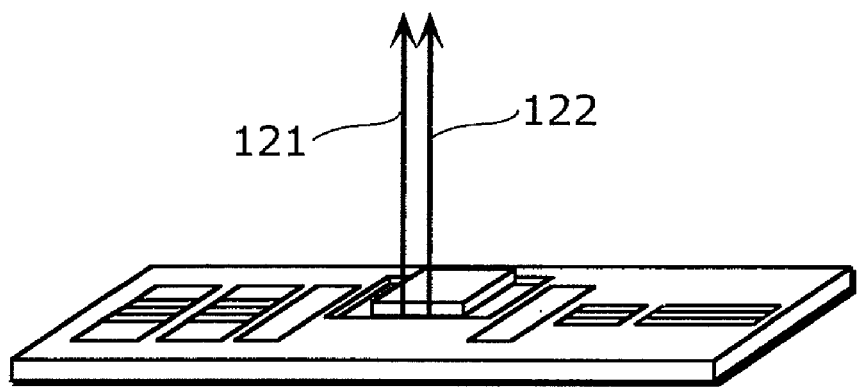
FIG. 8A is a diagonal-view diagram which shows the light source of the optical pickup device and the structure of the photo detector according to the second embodiment of the present invention.
Figure 8B:
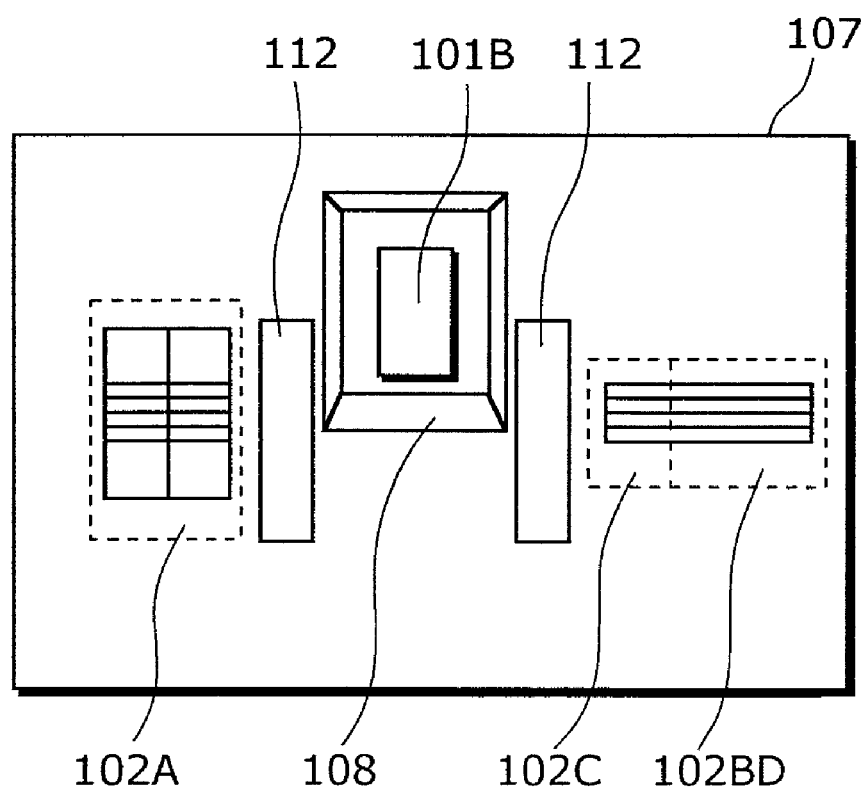
FIG. 8B is an overhead diagram which shows the light source of the optical pickup device and the structure of the photo detector according to the second embodiment of the present invention.

FIG. 8A is a diagonal view diagram of the integrated unit in which the light source 101B and the photo detector 102 are combined. FIG. 8B is an overhead diagram of the integrated unit in which the light source 101B and the photo detector 102 are combined. As shown in FIG. 8A and FIG. 8B, a photo detector 102 (102A, 102C and 102BD) a light source 101B, and a reflection prevention area 112 are formed on the substrate 107.

Third Embodiment

The optical pickup device according to the third embodiment of the present invention includes a photo detector 113 which receives ±primary diffracted light at the first wavelength.

FIG. 9 is a diagram which shows a conceptual structure of the optical pickup device according to the third embodiment of the present invention. Note that the same numbers are attached to the elements as in FIG. 2 and thus a detailed description is not repeated. The optical pickup device 300 shown in FIG. 9 stores, reproduces and deletes information in the optical information storage medium 106. The optical pickup device 300 includes the light sources 101A and 101B, the photo detectors 102A, 102BD and 102C, the diffraction element 103, the optical path combining unit 104, the light condensing unit 105 and a photo detector 113.

The photo detector 113 is formed at a position where ±primary diffracted light at the first wavelength in the semiconductor substrate is irradiated, the photo detector 102 being formed on the semiconductor substrate. The photo detector 113 has a function for receiving the unused ±primary diffracted light as signal light generated by the diffraction element 103 and sensing the diffracted light as signal light. For example, the photo detector 113 has a function for monitoring output of light at the first wavelength and is used as a photo detector for monitoring light output. Therefore, photo detectors for monitoring the output of light at the first wavelength, which are laid out at a different position from photo detectors which are not pictured, can be reduced, thereby reducing the number of parts. Thus, the optical pickup device can be miniaturized.

Figure 10A:
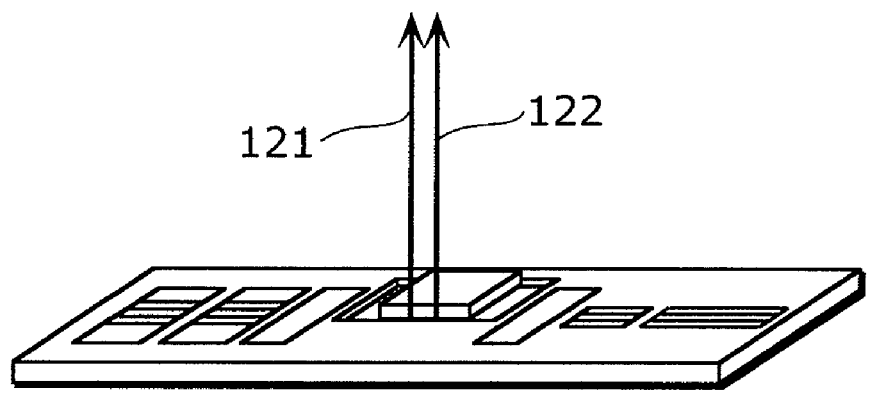
FIG. 10A is a diagonal-view diagram which shows the light source of the optical pickup device and the structure of the photo detector according to the third embodiment of the present invention.
Figure 10B:
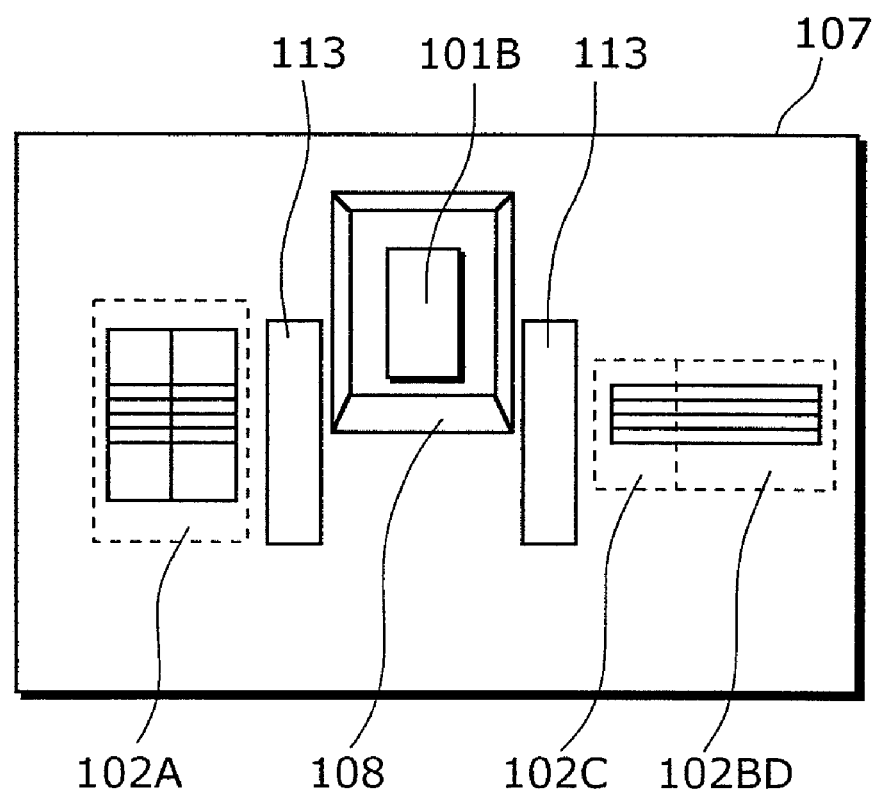
FIG. 10B is an overhead diagram which shows the light source of the optical pickup device and the structure of the photo detector according to the third embodiment of the present invention.

FIG. 10A is a diagonal view diagram of the integrated unit in which the light source 101B and the photo detector 102 are combined. FIG. 10B is an overhead diagram of the integrated unit in which the light source 101B and the photo detector 102 are combined. As shown in FIG. 10A and FIG. 10B, the photo detectors 102 (102A, 102C and 102BD), the light source 101B and the photo detector 113 are formed on the substrate 107.

Fourth Embodiment

The optical pickup device according to the fourth embodiment of the present invention includes a photo detector 114 which has a function for outputting a signal from the information storage medium.

Figure 11:
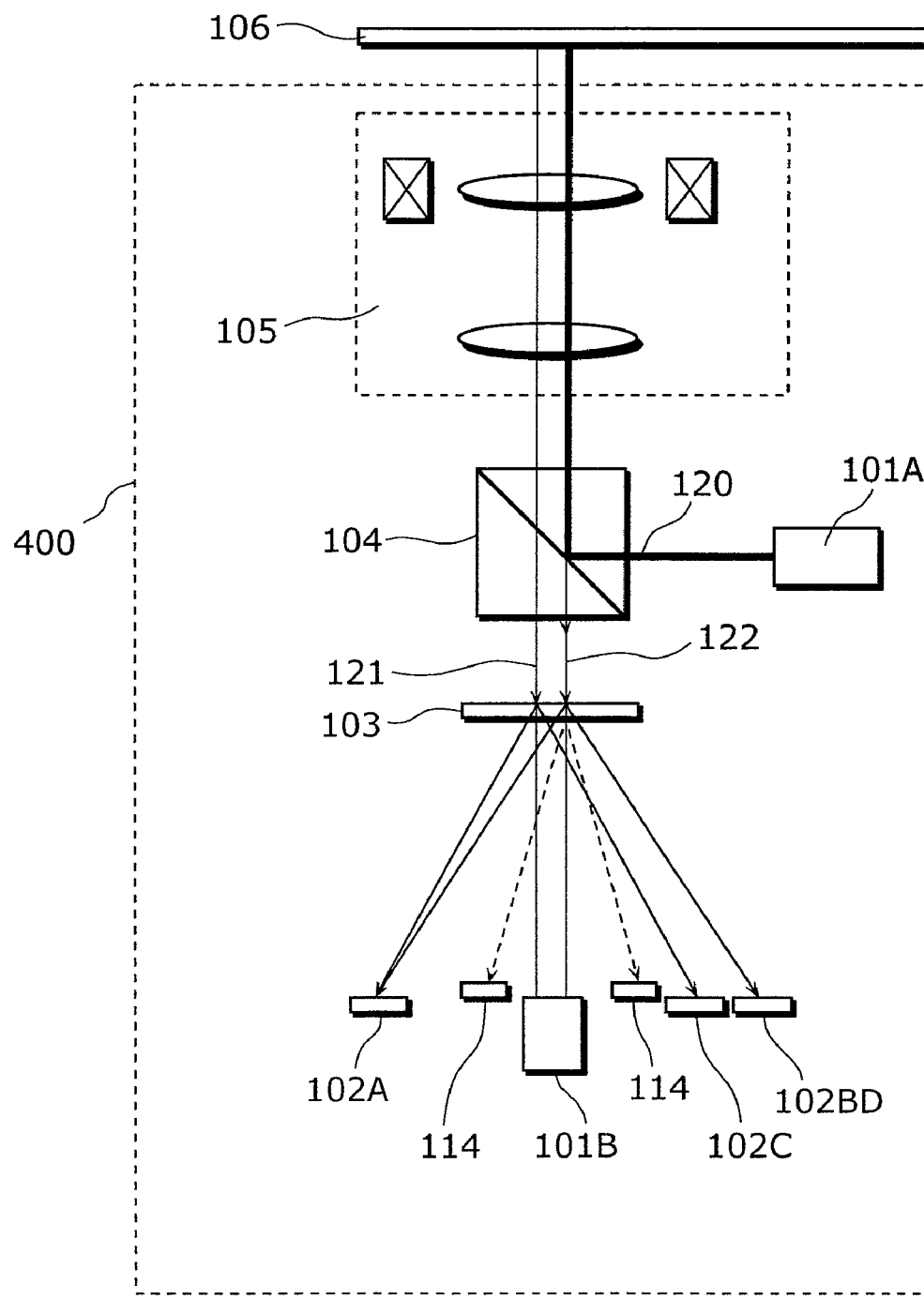
FIG. 11 is a diagram which shows the structure of the optical pickup device according to the fourth embodiment of the present invention.

FIG. 11 is a diagram which shows a conceptual structure of the optical pickup device according to the fourth embodiment of the present invention. Note that the same numbers are attached to the elements as in FIG. 2 and thus a detailed description is not repeated. The optical pickup device 400 shown in FIG. 11 stores, reproduces and deletes information in the optical information storage medium 106. The optical pickup device 400 includes the light source 101A and 101B, the photo detectors 102A, 102BD and 102C, the diffraction element 103, the optical path combining unit 104, the light condensing unit 105 and a photo detector 114.

The photo detector 114 is formed at a position where +primary diffracted light at the first wavelength in the semiconductor substrate is irradiated, the photo detector 102 being formed on the semiconductor substrate. The photo detector 114 has a function for receiving ±primary diffracted light which is unused as signal light in the first embodiment and second embodiment above, generated by the diffraction element 103, and sensing the diffracted light as signal light. In other words, the photo detector 114 has a function for outputting the signal from the optical information storage medium 106. By using the ±primary diffracted light at the first wavelength as a signal light from the optical information storage medium 106, the usage efficiency for light at the first wavelength can be improved.

Note that the photo detector 114 can be divided according to the ±diffracted light at the first wavelength.

Figure 12A:
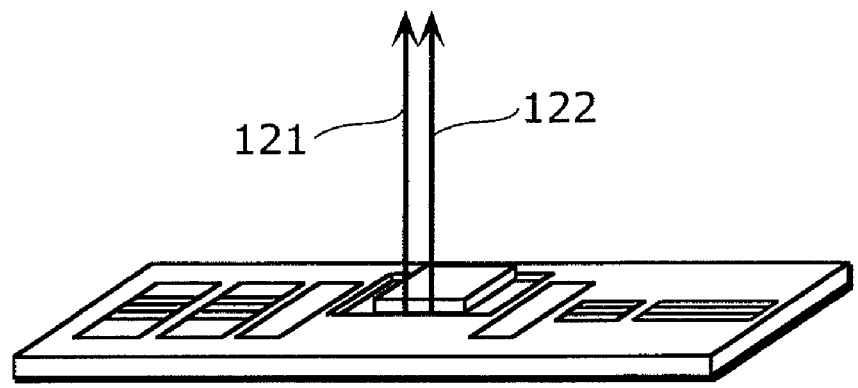
FIG. 12A is a diagonal-view diagram which shows the light source of the optical pickup device and the structure of the photo detector according to the fourth embodiment of the present invention.
Figure 12B:
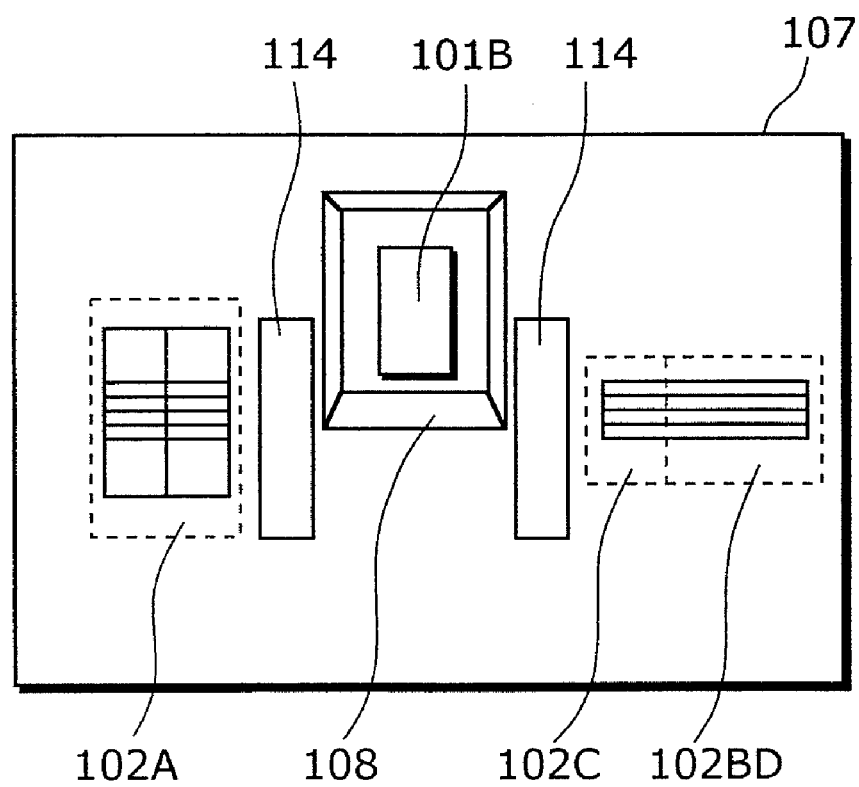
FIG. 12B is an overhead diagram which shows the light source of the optical pickup device and the structure of the photo detector according to the fourth embodiment of the present invention.

FIG. 12A is a diagonal view diagram of the integrated unit in which the light source 101B and the photo detector 102 are combined. FIG. 12B is an overhead diagram of the integrated unit in which the light source 101B and the photo detector 102 are combined. As shown in FIG. 12A and FIG. 12B, the photo detectors 102 (102A, 102C and 102BD), the light source 101B and the photo detector 114 are formed on the substrate 107.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention may be applied to an optical pickup device, and in particular may be applied to an optical pickup device which stores, reproduces and erases information on a BD (or an HD-DVD), a DVD and a CD.

What is claimed is:

1. An optical pickup device which performs at least one of writing and reading information in an optical information storage medium, said optical pickup device comprising:
   a light source which emits light at first, second and third wavelengths, the first wavelength being shorter than the second wavelength, and the second wavelength being shorter than the third wavelength;
   an optical path combining unit which combines vectors of the light at the first, second and third wavelengths which is emitted by said light source, and matches optical axes of the light at the first wavelength and the light at the third wavelength;
   a light condensing unit which condenses the light from said optical path combining unit onto the optical information storage medium;
   a diffraction element which diffracts light at the first, second and third wavelength that is reflected from the optical information storage medium, in a first direction and a second direction respectively;
   a first photo detector which receives light at the first, second and third wavelength that is diffracted in the first direction by said diffraction element;
   a second photo detector which receives light at the first and third wavelength that is diffracted in the second direction by said diffraction element; and
   a third photo detector which receives light at the second wavelength that is diffracted in the second direction by said diffraction element,
   wherein said first photo detector receives positive secondary diffracted light at the first wavelength, positive primary diffracted light at the second wavelength and positive primary diffracted light at the third wavelength from said diffraction element;
   said second photo detector receives negative secondary diffracted light at the first wavelength, and negative primary diffracted light at the third wavelength from said diffraction element;
   said third photo detector receives negative primary diffracted light at the second wavelength from said diffraction element, and
   a cross section shape of said diffraction element is a serrated shape.

2. The optical pickup device according to claim 1, further comprising
   a stray light reflection unit formed at a position where positive or negative primary diffracted light at the first wavelength diffracted by said diffraction element is irradiated,
   wherein said stray light reflection unit reflects irradiated light.

3. The optical pickup device according to claim 2,
   wherein said stray light reflection unit is composed of aluminum or gold.

4. The optical pickup device according to claim 1,
   wherein said first photo detector, said second photo receptor and said third photo receptor are formed on the same substrate, and the optical pickup device further includes:
   a reflection prevention unit formed at a position where positive or negative primary diffracted light diffracted by said diffraction element is irradiated;
   wherein said reflection prevention unit prevents irradiated light from entering the substrate.

5. The optical pickup device according to claim 1, further including
   a fourth photo detector which receives positive or negative primary diffracted light at the first wavelength which is diffracted by said diffraction element.

6. The optical pickup device according to claim 5,
   wherein said fourth photo detector monitors output of light at the first wavelength.

7. The optical pickup device according to claim 5,
   wherein said fourth photo detector outputs a signal from the optical information storage medium.

8. The optical pickup device according to claim 1,
   wherein light at the first wavelength is blue light, light at the second wavelength is red light and light at the third wavelength is infrared light.

9. The optical pickup device according to claim 1,
   wherein said light source includes a first light source which emits light at the first wavelength and a second light source which emits light at the second and third wavelength, and
   said second light source, said first photo detector, said second photo detector and said third photo detector are laid out on the same substrate.

10. The optical pickup device according to claim 1,
    wherein a cross section of said diffraction element having the serrated shaped has a concavoconvex shape of triangles arranged on one side.

11. The optical pickup device according to claim 1, wherein said diffraction element has a refractive index of 1.52 and a lattice space of 2.5 μm.

* * * * *